(12) United States Patent
Sugihara et al.

(10) Patent No.: US 11,209,995 B2
(45) Date of Patent: *Dec. 28, 2021

(54) INFORMATION PROCESSING APPARATUS THAT MOVES FILE BASED ON FILE SIZE, FILE ACCESS INTERVAL TIME AND STORAGE POWER CONSUMPTION

(71) Applicant: NEC Platforms, Ltd., Kawasaki (JP)

(72) Inventors: Mitumasa Sugihara, Kanagawa (JP); Akira Tago, Kanagawa (JP); Makoto Nakajima, Kanagawa (JP); Yuuki Hayakawa, Kanagawa (JP); Yasutaka Matsui, Kanagawa (JP); Kunitaka Negishi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/970,729

(22) PCT Filed: Feb. 25, 2019

(86) PCT No.: PCT/JP2019/006956
§ 371 (c)(1),
(2) Date: Aug. 18, 2020

(87) PCT Pub. No.: WO2019/176512
PCT Pub. Date: Sep. 19, 2019

(65) Prior Publication Data
US 2020/0379672 A1 Dec. 3, 2020

(30) Foreign Application Priority Data
Mar. 16, 2018 (JP) .............................. JP2018-049576

(51) Int. Cl.
*G06F 3/06* (2006.01)

(52) U.S. Cl.
CPC .......... G06F 3/0625 (2013.01); G06F 3/0647 (2013.01); G06F 3/0685 (2013.01)

(58) Field of Classification Search
CPC ....... G06F 3/0625; G06F 3/0647–0649; G06F 3/0653; G06F 3/0682
See application file for complete search history.

(56) References Cited

U.S. PATENT DOCUMENTS 5,357,495 A * 10/1994 Solhjell ................ G11B 15/681
250/566
8,595,535 B1 * 11/2013 Tamilarasan ........ G06F 11/3062
713/340

(Continued)

FOREIGN PATENT DOCUMENTS

JP 2007-115232 A 5/2007
JP 2007-272721 A 10/2007

(Continued)

OTHER PUBLICATIONS

International Search Report for PCT Application No. PCT/JP2019/006956, dated May 21, 2019.

(Continued)

*Primary Examiner* — Chie Yew
(74) *Attorney, Agent, or Firm* — Sughrue Mion, PLLC

(57) ABSTRACT

An information processing apparatus of the present invention is an information processing apparatus that manages a hierarchical storage including a primary storage and a secondary storage. The information processing apparatus includes an acquisition unit that acquires a measurement value obtained by measuring a power consumption amount of each of the primary storage and the secondary storage, a determination unit that determines whether or not to move a file between the primary storage and the secondary storage, on the basis of a condition for determining a storage destination of the file to be stored in the hierarchical storage with (Continued)

use of the measurement value, the size of the file, and the access interval time of the file, and a relocation unit that moves the file between the primary storage and the secondary storage in accordance with the determination.

13 Claims, 9 Drawing Sheets

(56) References Cited

U.S. PATENT DOCUMENTS

| | | |
|---|---|---|
| 2007/0271413 A1 | 11/2007 | Fujibayashi et al. |
| 2009/0207520 A1* | 8/2009 | Golasky ............... G06F 1/3203 360/69 |
| 2009/0289138 A1 | 11/2009 | Nadehara |
| 2010/0199035 A1 | 8/2010 | Matsuo et al. |
| 2010/0274826 A1 | 10/2010 | Takada et al. |
| 2011/0102938 A1* | 5/2011 | Bates ................... G11B 15/026 360/78.02 |
| 2011/0307721 A1* | 12/2011 | Ouchi .................. G06F 3/0653 713/321 |
| 2016/0124678 A1 | 5/2016 | Hasegawa et al. |
| 2016/0224265 A1* | 8/2016 | Chinnakkonda Vidyapoornachary ..................... G06F 13/4247 |
| 2018/0260413 A1 | 9/2018 | Matsui et al. |

FOREIGN PATENT DOCUMENTS

| | | |
|---|---|---|
| JP | 2010-176497 A | 8/2010 |
| JP | 2010-257094 A | 11/2010 |
| JP | 6075571 B2 | 2/2017 |
| JP | 2018-151815 A | 9/2018 |

OTHER PUBLICATIONS

Japanese Office Action for JP Application No. 2018-049576 dated Oct. 1, 2019 with English Translation.
Japanese Office Action for JP Application No. 2018-049576 dated Mar. 10, 2020 with English Translation.
Japanese Office Action for JP Application No. 2018-049576 dated Jul. 15, 2020 with English Translation.

* cited by examiner

FIG. 3

| | Read | Write | Load | Unload | Rewind | Locate | Idle | Move |
|---|---|---|---|---|---|---|---|---|
| 1 | 28 | 35 | 69 | 62 | 62 | 57 | 19 | 40 |
| 2 | 30 | 30 | 60 | 55 | 61 | 50 | 18 | 42 |
| 3 | 32 | 34 | 50 | 50 | 62 | 55 | 19 | 47 |
| 4 | 40 | 33 | 45 | 56 | 60 | 52 | 21 | 35 |
| 5 | 30 | 35 | 50 | 40 | 62 | 50 | 18 | 48 |
| ave | 32 | 33.4 | 54.8 | 52.6 | 61.4 | 52.8 | 19 | 42.4 |

TAPE LIBRARY DEVICE POWER CONSUMPTION [W]

| | RAID POWER CONSUMPTION [W] |
|---|---|
| 1 | 2382 |
| 2 | 2459 |
| 3 | 2410 |
| 4 | 2425 |
| 5 | 2449 |
| ave | 2425 |

INFORMATION PROCESSING APPARATUS THAT MOVES FILE BASED ON FILE SIZE, FILE ACCESS INTERVAL TIME AND STORAGE POWER CONSUMPTION

This application is a National Stage Entry of PCT/JP2019/006956 filed on Feb. 25, 2019, which claims priority from Japanese Patent Application 2018-049576 filed on Mar. 16, 2018, the contents of all of which are incorporated herein by reference, in their entirety.

TECHNICAL FIELD

The present invention relates to an information processing apparatus, an information processing system, a program, and an information processing method, for managing a hierarchical storage including a primary storage and a secondary storage.

BACKGROUND ART

Various types of hierarchical storages each including a primary storage and a secondary storage are proposed and put into practice. In such a hierarchical storage, data relocation is performed by moving a file between the primary storage and the secondary storage.

For example, Patent Literature 1 discloses a hierarchical storage having a primary storage including a hard disk drive (HDD) or a solid state drive (SSD) and a secondary storage including a sequential access device such as a tape drive. In Patent Literature 1, when the HDD utilization exceeds a specific threshold or when the time instructed by a user arrives, a file is moved from the primary storage to the secondary storage.

Patent Literature 2 discloses a hierarchical storage having a primary storage including a RAID device using an expensive disk having a high access velocity, and a secondary storage including a RAID device using an inexpensive disk having a low access velocity or a magnetic tape device. In Patent Literature 2, data in which the access frequency is lowered and data in which the access time interval is prolonged are moved from the primary storage to the secondary storage.

Patent Literature 1: JP 6075571 B
Patent Literature 2: JP 2007-272721 A

SUMMARY

Along with the spread of the Internet and globalization in recent years, required storage capacity is increased. Accordingly, the power consumption amount of a hierarchical storage is increasing year by year. However, with the method of relocating data as described above, that is, a method of moving a file from a primary storage to a secondary storage when the HDD utilization exceeds a specific threshold, when the time designated by a user arrives, or when the access frequency is lowered so that the access time interval is prolonged, it is difficult to suppress the power consumption amount of the hierarchical storage.

An object of the present invention is to provide an information processing apparatus capable of solving the aforementioned problem, that is, a problem that it is impossible to perform data relocation for suppressing the power consumption amount of a hierarchical storage.

An information processing apparatus according to one aspect of the present invention is an information processing apparatus that manages a hierarchical storage including a primary storage and a secondary storage. The apparatus is configured to include an acquisition unit that acquires a measurement value obtained by measuring the power consumption amount of each of the primary storage and the secondary storage, a determination unit that determines whether or not to move a file between the primary storage and the secondary storage, on the basis of a condition for determining a storage destination of the file to be stored in the hierarchical storage with use of the measurement value, the size of the file, and the access interval time of the file, and a relocation unit that moves the file between the primary storage and the secondary storage in accordance with the determination.

An information processing method according to another aspect of the present invention is an information processing method performed by an information processing apparatus that manages a hierarchical storage including a primary storage and a secondary storage. The method includes acquiring a measurement value obtained by measuring the power consumption amount of each of the primary storage and the secondary storage, determining whether or not to move a file between the primary storage and the secondary storage, on the basis of a condition for determining a storage destination of the file to be stored in the hierarchical storage with use of the measurement value, the size of the file, and the access interval time of the file, and moving the file between the primary storage and the secondary storage in accordance with the determination.

A program according to another aspect of the present invention is a program for causing an information processing apparatus that manages a hierarchical storage including a primary storage and a secondary storage to realize an acquisition unit that acquires a measurement value obtained by measuring the power consumption amount of each of the primary storage and the secondary storage, a determination unit that determines whether or not to move a file between the primary storage and the secondary storage, on the basis of a condition for determining a storage destination of the file to be stored in the hierarchical storage with use of the measurement value, the size of the file, and the access interval time of the file, and a relocation unit that moves the file between the primary storage and the secondary storage in accordance with the determination.

An information processing system according to another aspect of the present invention is configured to include a hierarchical storage including a primary storage and a secondary storage, an information processing apparatus that manages the hierarchical storage, and a measurement device that measures the power consumption amount of each of the primary storage and the secondary storage.

The information processing apparatus is configured to include an acquisition unit that acquires a measurement value obtained by measuring the power consumption amount of each of the primary storage and the secondary storage, a determination unit that determines whether or not to move a file between the primary storage and the secondary storage, on the basis of a condition for determining a storage destination of the file to be stored in the hierarchical storage with use of the measurement value, the size of the file, and the access interval time of the file, and a relocation unit that moves the file between the primary storage and the secondary storage in accordance with the determination.

With the configurations described above, the present invention can suppress the power consumption amount of a hierarchical storage by data relocation.

BRIEF DESCRIPTION OF DRAWINGS

FIG. 3 illustrates an example of power consumption measured.

EXEMPLARY EMBODIMENTS

First Exemplary Embodiment

A first exemplary embodiment of the present invention will be described in detail with reference to the drawings.

Figure 1:
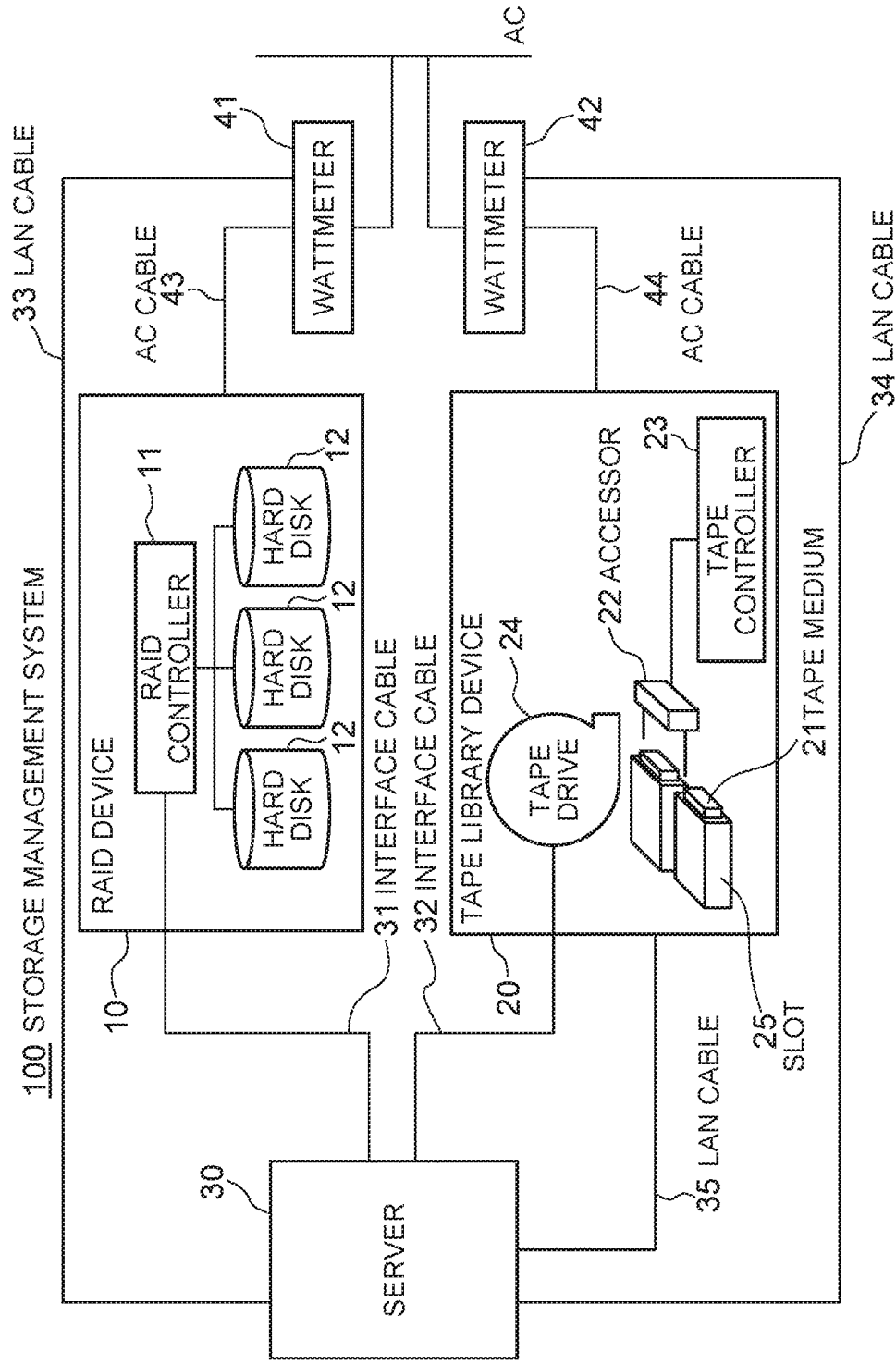
FIG. 1 is a block diagram illustrating a configuration of a storage management system according to a first exemplary embodiment of the present invention.

Referring to FIG. 1, a storage management system 100 (information processing system) according to the first exemplary embodiment of the present invention includes a redundant array of inexpensive disks (RAID) device 10 (disk device), a tape library device 20 (magnetic tape device), and a server 30 (information processing apparatus). The storage management system 100 also includes two wattmeters 41 and 42 (measurement devices).

The RAID device 10 is a primary storage constituting a hierarchical storage. The RAID device 10 is configured of a RAID controller 11 that processes data and a plurality of hard disks 12 in which data is stored. The RAID device 10 is constantly supplied with power for holding data and accessibility. The RAID controller 11 is connected to the server 30 via an interface cable 31, and receives a read request and a write request of data from the server 30. The RAID device 10 operates with alternating current (AC) power supply. On an AC cable 43 that is a power supply channel thereof, the wattmeter 41 is provided, so that the power consumption amount can be measured.

The tape library device 20 is a secondary storage constituting the hierarchical storage. The tape library device 20 is configured of a tape medium 21, an accessor 22 that conveys the tape medium 21, a tape controller 23, a tape drive 24 that performs reading and writing on the tape medium 21, and a slot 25. The tape drive 24 is connected to the server 30 via an interface cable 32, and receives a read request and a write request of data from the server 30.

In general, power is constantly supplied to the tape drive 24, the accessor 22, and the tape controller 23. When reading or writing of data is not performed, the tape medium 21 is stored in the slot 25 in the device, and power is not consumed. For data writing, the tape medium 21 is conveyed to the tape drive 24 by the accessor 22 and the tape is moved to a designated location in the tape medium 21 by the motor of the tape drive 24, and then writing is performed.

The tape library device operates with AC power supply. On an AC cable 44 that is a power supply channel thereof, the wattmeter 42 is provided, so that the power consumption amount can be measured. Moreover, the tape library device 20 is connected to the server 30 via a LAN cable 35 or a serial cable. Therefore, the server 30 side can check the operation mode of the tape library device 20.

The server 30 is a computer that processes data. In order to allow a data access from the server 30 to the RAID device 10, a file system supported by the OS of the server 30 is configured. Also, in order to allow a data access from the server 30 to the tape library device 20, a file system like a linear tape file system (LTFS) is configured. Note that the data access methods described above are examples. Data access methods from the server 30 to the RAID device 10 and to the tape library device 20 are not limited to the examples described above.

Here, the server 30 is configured to include a central processing unit (CPU), a memory such as a random access memory (RAM), a read only memory (ROM), a storage device such as a HDD or a flash memory, an input device such as a keyboard, an output device such as a liquid crystal display, and interfaces such as a network interface and an input/output interface. The server 30 is connected to the RAID device 10 via the interface cable 31, and is connected to the tape library device 20 via the interface cable 32. Further, the server 30 is connected to the wattmeters 41 and 42 via the LAN cables 33 and 34, respectively.

Figure 2:
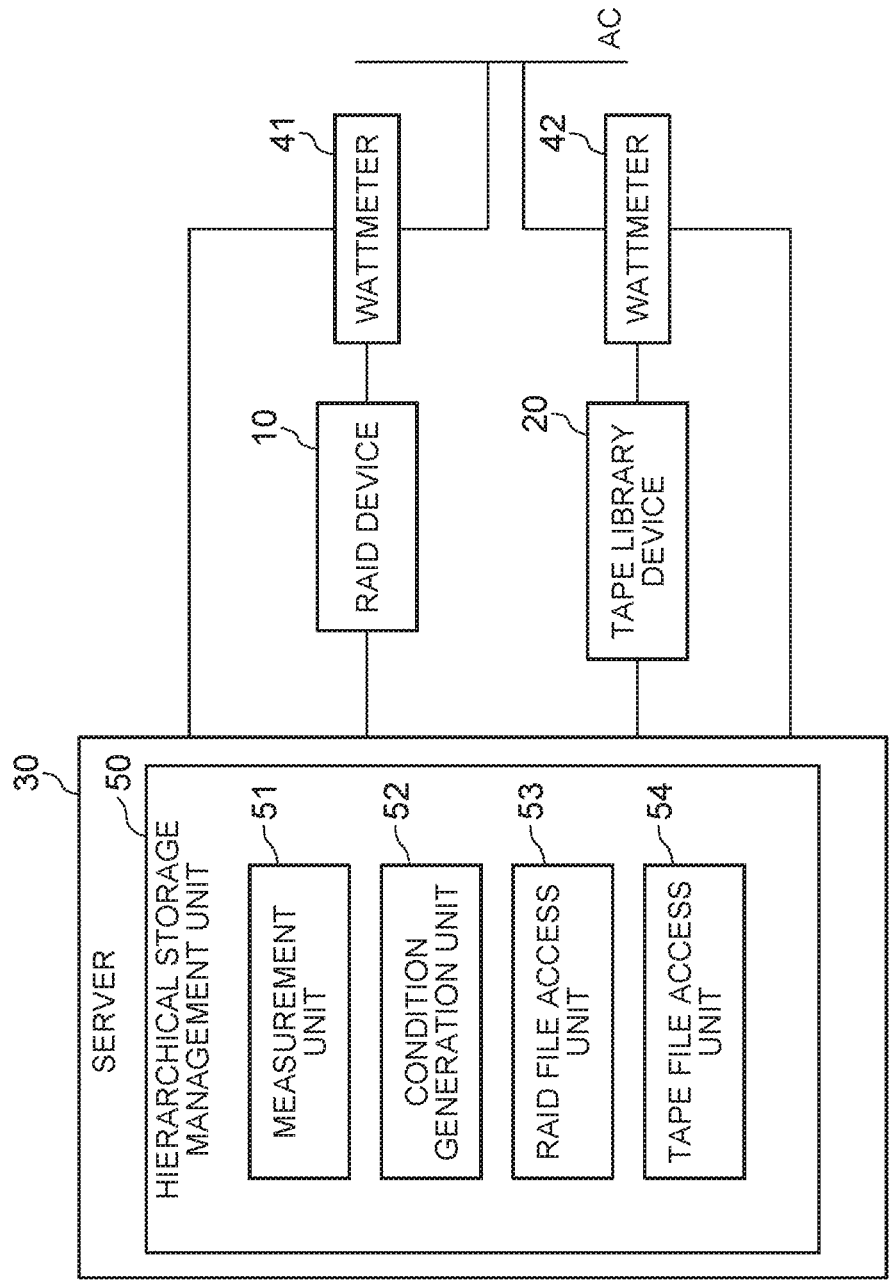
FIG. 2 is a block diagram illustrating a configuration of a server according to the first exemplary embodiment of the present invention.

The server 30 reads a program stored in a storage device and develops it on the memory to thereby realize a desired function and processing, under control of the CPU. FIG. 2 shows exemplary functions held by the server 30. In this example, the server 30 includes a hierarchical storage management unit 50 constructed by execution of a program by the CPU. The hierarchical storage management unit 50 includes a measurement unit 51, a condition generation unit 52, a RAID file access unit 53, and a tape file access unit 54.

The measurement unit 51 (acquisition unit) acquires the power consumption amounts (measurement values) of the RAID device 10 that is a primary storage and the tape library device 20 that is a secondary storage, from the wattmeters 41 and 42 connected via the LAN cables 33 and 34, respectively. At that time, the measurement unit 51 measures the power consumption amount a plurality of times, and acquires an average value thereof as the power consumption amount. Particularly, in the present embodiment, the power consumption amount of the RAID device 10 is measured regardless of the operation mode thereof, and the power consumption amount of the tape library device 20 is measured for each operation mode, as described below.

The condition generation unit 52 has a function of generating a condition for determining a storage destination (saving destination) of a file, that is, one of the RAID device 10 and the tape library device 20 that is superior in the viewpoint of power consumption amount, on the basis of the power consumption amount, the file size, and the file access interval time.

The RAID file access unit 53 (determination unit, relocation unit) has a function of reading and writing a file stored in the RAID device 10. The RAID file access unit 53 also has a function of determining whether or not to move a file stored in the RAID device 10 to the tape library device 20, on the basis of a condition generated by the condition generation unit 52. The RAID file access unit 53 also has a function of moving the file stored in the RAID device 10 to the tape library device 20 on the basis of the determination.

The tape file access unit 54 (determination unit, relocation unit) has a function of reading and writing a file stored in the tape library device 20. The tape file access unit 54 also has a function of determining whether or not to move a file stored in the tape library device 20 to the RAID device 10, on the basis of a condition generated by the condition generation unit. The tape file access unit 54 also has a function of moving the file stored in the tape library device 20 to the RAID device 10 on the basis of the determination.

Hereinafter, the functions of the condition generation unit 52, the RAID file access unit 53, and the tape file access unit 54 will be described in detail.

First, description will be given on a method of generating a condition for determining a storage destination of a file, that is, one of the RAID device 10 and the tape library device 20 that is superior in the viewpoint of power consumption amount, on the basis of the power consumption amount, the file size, and the file access interval time.

Referring to FIG. 1, as a primary storage, the RAID device 10 is used as a disk. In general, the RAID device 10 constantly supplies power for holding data and accessibility. The power is supplied to the RAID controller 11 and the hard disk 12. The server 30 and the RAID controller 11 are connected to each other by the interface cable 31. The RAID device 10 receives a data read request and a data write request from the server 30 via the interface cable 31.

When reading data stored in the hard disk 12, the RAID device 10 allows the magnetic head in the hard disk 12 to seek the location where the data is stored to read data, processes the readout data by the RAID controller 11, and returns it to the server 30 that is the source of the read request.

Here, power consumption required for reading a unit data capacity by the RAID device 10 is assumed to be P(Dread) (watt (W)/gigabyte (GB)). P(Dread) is given by the following expression, where S(D) (GB) represents the effective capacity of the RAID device 10 and the P(D) (W) represents the power consumption of the RAID device 10:

$$P(Dread)=P(D)/S(D)(W/GB) \quad \text{Expression 1-1}$$

Further, it is assumed that the disk data access interval time is represented by T(D) (second (s)) and the data amount to be read is represented by U (GB). In the case of reading a file of the data amount U with the access interval time T(D), the power consumption amount when the file is stored in the RAID device 10 is calculated by the following expression:

$$P(Dread) \times U \times T(D)/3600(Wh) \quad \text{Expression 1-2}$$

On the other hand, referring to FIG. 1, as a secondary storage, the tape library device 20 is used as a tape. The tape library device 20 is mainly configured of the tape medium 21, the accessor 22 that conveys the tape medium 21, the tape controller 23, and the tape drive 24 that performs reading and writing on the tape medium 21. Among them, the tape drive 24, the accessor 22, and the tape controller 23 are constantly supplied with power, generally. When reading and writing of data is not performed, the tape medium 21 is stored in the slot 25 in the device, and power is not consumed. For reading data by the tape library device 20, the tape medium 21 is conveyed to the tape drive 24 by the accessor 22 and the tape is moved to a designated location in the tape medium 21 by the motor of the tape drive 24, and then the data is read.

Accordingly, at the time of reading data stored in the tape media 21, the power consumption amount for motor operation of the accessor 22 and for locating the tape medium 21 by the motor of the tape drive 24, and the power consumption amount required for reading data from the tape drive 24 are involved. Even when reading is not performed, in the tape library device 20, power is consumed by the tape controller 23, the accessor 22, and the tape drive 24 for waiting. As described above, the server 30 and the tape drive 24 are connected to each other via the interface cable 32, and a data read request and a data write request by the server 30 is received.

Here, the power consumption amount for motor operation of the accessor 22 and for locating the tape medium 21 by the motor of the tape drive 24 is represented by Ph(Tmove) (Wh). It is assumed that the value of Ph(Tmove) does not depend on the data amount. Ph(Tmove) can be calculated as described below.

First, the power consumption amount when the tape medium 21 in the slot 25 is moved by the accessor 22 is given by the following expression, where P(Tmove_acc) (W) represents power consumption when the tape medium 21 in the slot 25 is moved to the accessor 22 and T(Tmove_acc) (s) represents the time taken for conveying the tape medium 21:

$$P(Tmove\_acc) \times T(Tmove\_acc)/3600(Wh) \quad \text{Expression 2-1}$$

The power consumption amount for loading the tape medium 21 to the tape drive 24 is given by the following expression, where P(Tmove_drive_load) (W) represents power consumption when the tape drive 24 is loaded to the tape medium 21, and T(Tmove_drive_load) (s) represents the time taken for loading:

$$P(Tmove\_drive\_load) \times T(Tmove\_drive\_load)/3600 \\ (Wh) \quad \text{Expression 2-2}$$

The power consumption amount for locating the tape medium 21 by the tape drive 24 is given by the following expression, where P(Tmove_drive_locate) (W) represents power consumption for locating the tape medium 21, and T(Tmove_drive_locate) (s) represents the time taken for locating:

$$P(Tmove\_drive\_locate) \times T(Tmove\_drive\_locate)/3600 \\ (Wh) \quad \text{Expression 2-3}$$

The power consumption amount for rewinding the tape after the processing is given by the following expression, where P(Tmove_drive_rewind) (W) represents power consumption for rewinding the tape of the tape medium 21, and T(Tmove_drive_rewind) (s) represents the time taken for rewinding:

$$P(Tmove\_drive\_rewind) \times T(Tmove\_drive\_rewind)/ \\ 3600(Wh) \quad \text{Expression 2-4}$$

The power consumption amount for unloading is given by the following expression, where P(Tmove_drive_unload) (W) represents power consumption for unloading the tape media 21 from the tape drive 24, and T(Tmove_drive_unload) (s) represents the time taken for unloading:

$$P(Tmove\_drive\_unload) \times T(Tmove\_drive\_unload)/3600 (Wh) \quad \text{Expression 2-5}$$

Further, when the tape medium 21 is moved from the tape drive 24 to the slot 25 with use of the accessor 22, the power consumption amount that is the same as the power consumption amount calculated by Expression 2-1, that is, $P(Tmove\_acc) \times T(Tmove\_acc)/3600$ (Wh), is required.

Ph(Tmove) is given by the following expression with use of Expressions 2-1 to 2-5:

$$Ph(Tmove) = P(Tmove\_acc) \times T(Tmove\_acc)/3600 \times 2 + P(Tmove\_drive\_load) \times T(Tmove\_drive\_load)/3600 + P(Tmove\_drive\_locate) \times T(Tmove\_drive\_locate)/3600 + P(Tmove\_drive\_rewind) \times T(Tmove\_drive\_rewind)/3600 + P(Tmove\_drive\_unload) \times T(Tmove\_drive\_unload)/3600 (Wh) \quad \text{Expression 2-6}$$

On the other hand, the power consumption amount for reading the data amount U (GB) is given by the following expression, where P(Tread) (W/BG) represents power consumption required for reading a unit capacity by the tape, and T(Tread) (s) represents the tape data access time (tape processing time):

$$P(Tread) U \times T(Tread)/3600 (Wh) \quad \text{Expression 3-1}$$

Here, regarding T(Tread), the following relationship is established when the data amount U (GB) is read, where V(Tread) (GB/s) represents the transfer velocity of the tape drive 24:

$$T(Tread) = U/V(Tread)(s) \quad \text{Expression 3-2}$$

When Expression 3-2 is substituted in Expression 3-1, Expression 3-1 is transformed to the following expression:

$$P(Tread) \times U \times U/(V(Tread) \times 3600 (Wh)) \quad \text{Expression 3-3}$$

Here, P(Tread) is given by the following expression, where S(T) (GB) represents the effective capacity of the tape library device 20, and P(Tr) (W) represents the power consumption for reading by the tape drive:

$$P(Tread) = P(Tr)/S(T)(W/GB) \quad \text{Expression 3-4}$$

The power consumption amount when the tape library device 20 waits after a data access is given by the following expression, where P(Twait) represents power consumption required for waiting by the tape library device 20 per unit capacity, and T(Twait) (s) represents the tape data access waiting time:

$$P(Twait) \times U \times T(Twait)/3600 (Wh) \quad \text{Expression 4-1}$$

Here, P(Twait) is given by the following expression, where S(T) (GB) represents the effective capacity of the tape library device 20, and P(Tw) (W) represents the standby power consumption of the tape library device 20:

$$P(Twait) = P(Tw)/S(T)(W/GB) \quad \text{Expression 4-2}$$

From Expressions 2-6, 3-3, and 4-1, the power consumption amount when a file is stored in the tape is given by the following expression:

$$Ph(Tmove) + P(Tread) \times U \times U/(V(Tread) \times 3600) + P(Twait) \times U \times T(Twait)/3600 \quad \text{Expression 5-1}$$

Here, T(Tread) and T(Twait) related to the tape processing time and the disk data access interval time T(D) have a relationship shown by the following expression:

$$T(D)(Tread) + (Twait) \quad \text{Expression 6-1}$$

Further, with respect to the read performance of an LTO6 drive 160 MB/s, when the read data amount per read is about 10 GB for example, the time required for reading is about 63 seconds. In that case, assuming that the tape processing waiting time is several hours or more, the tape processing time T(Tread) is very small relative to the tape processing waiting time (Twait). In the case where the tape processing time T(Tread) is very small compared with the tape processing waiting time T(Twait) like this example, Expression 6-1 is approximated as shown below.

$$T(D) \approx T(Twait) \quad \text{Expression 6-2}$$

With use of Expressions 1-2 and 5-1, a condition under which the power consumption amount of the tape falls below the power consumption amount of the disk is shown by the following expression:

$$P(Dread) \times U \times T(D)/3600 \geq Ph(Tmove) + P(Tread) \times U \times U/(V(Tread) \times 3600 + P(Twait) \times U \times T(Twait)/3600 \quad \text{Expression 7-1}$$

With use of Expression 6-2, when Expression 7-1 is transposed on T(D), the following Expression 7-2 is established:

$$T(D) \geq \{3600 \times Ph(Tmove) + P(Tread)/V(Tread) \times U \times U\}/\{(P(Dread) - P(Twait)) \times U\} \quad \text{Expression 7-2}$$

By substituting Expression 2-6, 3-4, and 4-2 in Expression 7-2, a specific conditional expression is derived. That is, a condition for the data access interval T(D) and the data amount U, in which the power consumption amount of the tape falls below the power consumption amount of the disk, is obtained.

Here, parameters that need definition, among the parameters described above, are as follows:

P(D), S(D), P(Tmove_acc), P(Tmove_drive_load), T(Tmove_drive_load),
P(Tmove_drive_locate), T(Tmove_drive_locate),
P(Tmove_ drive_rewind),
P(Tmove_drive_unload), T(Tmove_drive_unload),
V(Tread), P(Tr), P(Tw), and S(T).

S(D) and S(T) are parameters that are clarified when the system is constructed, and will not be changed dynamically except for a change in the system design. For example, S(D) is assumed to be 320000 gigabytes. As S(D), a disk of a 4-terabyte HDD is used for the RAID configuration, and 8 disks constitute 1 logical volume. For RAID 6 configuration, it is configured of 10 disks in total including 2 disks as parity disks. 1 logical volume has 32 terabytes (=32000 gigabytes). In the present configuration, 100 disks of HDD are used to constitute 10 logical volumes.

In S(T), the capacity of one volume of LTO7 tape medium is 6000 gigabytes, and S(T) has 180000 gigabytes as a tape library device in which 30 volumes can be stored.

Further, related to V(Tread), a drive to be used is clarified when the system is constructed, and will not be changed dynamically except for a change in the system design. By using LTO7 drive, 0.30 GB/s is realized.

Regarding T(Tmove_acc), T(Tmove_drive_load), T(Tmove_drive_locate), T(Tmove_drive_rewind), and T(Tmove_drive_unload), an average operation time that is estimated from the travel distance of the accessor 22 and the tape length is set in advance.

T(Tmove_acc) is assumed to be 37 seconds.
T(Tmove_drive_load) is assumed to be 17 seconds.
T(Tmove_drive_locate) is assumed to be 63 seconds.
T(Tmove_drive_rewind) is assumed to be 63 seconds.
T(Tmove_drive_unload) is assumed to be 17 seconds.

Regarding P(D), P(Tmove_acc), P(Tmove_drive_load), P(Tmove_drive_locate), P(Tmove_drive_rewind), P(Tmove_drive_unload), P(Tr), and P(Tw), since the values vary drastically during operation, a method that permanently uses the parameters defined previously is not used. The power consumption amount is sensed periodically, and the parameters are updated periodically. That is, the power consumption amount of the RAID device 10 and the power consumption amount per operation mode of the tape library device 20, measured by the wattmeters 41 and 42 and acquired by the measurement unit 51, are used.

Figure 5:
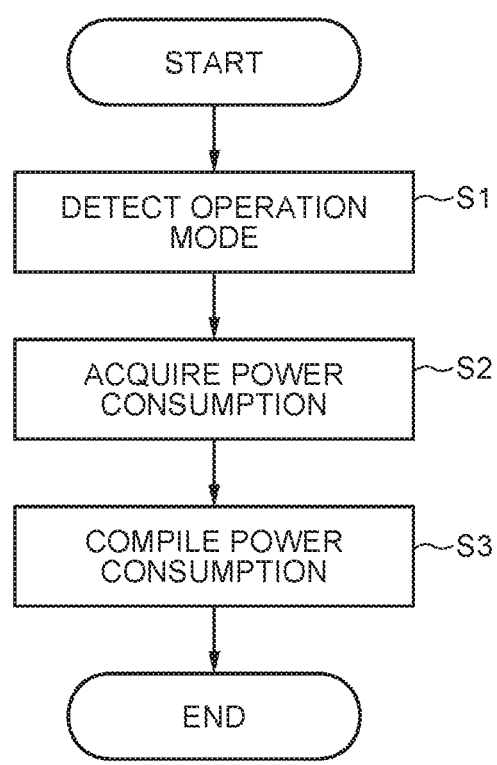
FIG. 5 is a flowchart illustrating an exemplary process of measuring power consumption by a server in the first exemplary embodiment of the present invention.

Here, measurement of the power consumption amounts by the wattmeters 41 and 42 and the measurement unit 51 will be described with reference to the tables of FIG. 3 and the flowchart of FIG. 5. First, the power consumption amounts acquired by the measurement unit 51 are compiled in lists as illustrated in FIG. 3, and an average value is calculated therefrom. In the present embodiment, in the RAID device 10, since the power consumption amount is defined to be constant regardless of the device operation mode, sensing of the power consumption amount is performed regardless of the device operation mode, and the power consumption amount is recorded as shown in the left table of FIG. 3. The sensing interval is not designated particularly. For example, the power consumption amount is recorded five times, and an average value is calculated and is defined as P(D) that is the power consumption amount of the RAID device 10. In the example of the left table in FIG. 3, an average value 2425 [w] is calculated from the measurement results (2382, 2459, 2410, 2425, 2449) of the latest five times, and is set as P(D). This value represents P(D) of a certain point of time, and is updated periodically.

Further, in the present embodiment, in the tape library device 20, constituent units that consume power differ depending on the operation mode. Accordingly, the power consumption amount also differs depending on the operation mode. Therefore, the server 30 and the tape library device 20 are connected to each other by the LAN cable 35 (or serial cable), the operation mode of the tape library device 20 is checked (step S1 of FIG. 5), and the power consumption measured by the wattmeter 42 is monitored (step S2 of FIG. 5). Then, a power consumption list for each operation mode is created by the server 30, and each average value is calculated (step S3 of FIG. 5). In the example shown in the right table of FIG. 3, in the device operation mode "move" (when the tape medium in the slot is moved by the accessor), an average value 42.4 [w] is calculated from the measurement results (40, 42, 47, 35, 48) of the latest five times recorded in the device operation mode "move", and the value is set as P(Tmove_acc) (power consumption amount when the tape medium in the slot is moved by the accessor).

Similarly, regarding
P(Tmove_drive_load) (power consumption amount when the tape medium is loaded to the tape drive),
P(Tmove_drive_locate) (power consumption amount when the tape medium is located by the tape drive),
P(Tmove_drive_rewind) (power consumption amount when the tape medium is rewound by the tape drive),
P(Tmove_drive_unload) (power consumption amount when the tape medium is unloaded from the tape drive),
P(Tr) (power consumption amount when read by the tape drive), and
P(Tw) (power consumption amount when waiting),
respective average values are calculated from the latest measurement results and set as described below, respectively. For example, the following values represent values of a certain point of time and are updated periodically:
P(Tmove_drive_load) is 54.8 [w],
P(Tmove_drive_locate) is 52.8 [w],
P(Tmove_drive_rewind) is 61.4 [w],
P(Tmove_drive_unload) is 52.6 [w],
P(Tr) is 32 [w], and
P(Tw) is 19 [w].

Figure 4:
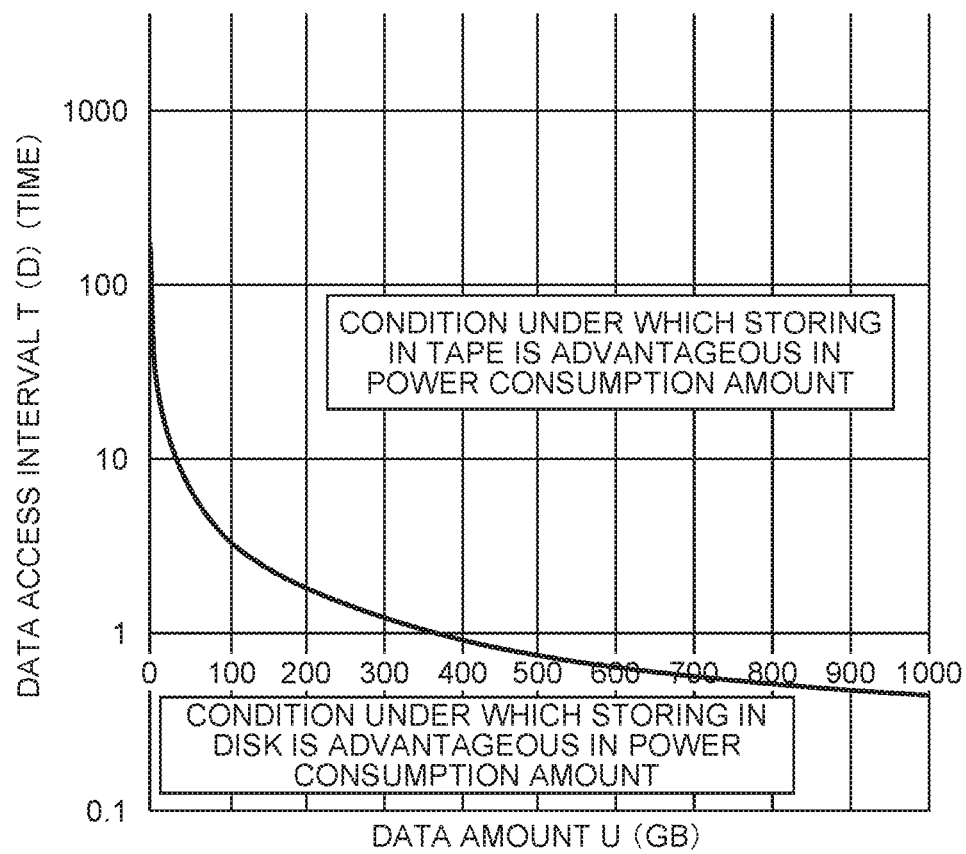
FIG. 4 is a graph showing an exemplary condition for determining a storage destination of a file, that is, one of a primary storage or a secondary storage that is superior in the viewpoint of power consumption amount, on the basis of the file size and the file access interval time.

FIG. 4 illustrates a graph showing the relationship between T(D) and U in Expression 7-2, with use of the aforementioned values. According to this graph, efficiency in the power consumption amount per unit capacity can be improved if data is moved from the disk to the tape under the condition shown in the upper area of the graph. For example, when data is moved from the disk to the tape under the following conditions, there is an advantage in the power consumption amount at the time of reading data.

For the data amount of 0.2 gigabytes, when the access interval is 1673.3 hours (69.8 days) or longer.
For the data amount of 2 gigabytes, when the access interval is 169.4 hours (7.1 days) or longer.
For the data amount of 20 gigabytes, when the access interval is 17.0 hours or longer.
For the data amount of 200 gigabytes, when the access interval is 1.8 hours or longer.

As described above, the condition generation unit 52 illustrated in FIG. 2 generates a condition as shown in the graph of FIG. 4, that is, a condition for determining a storage destination of a file, that is, one of the RAID device 10 or the tape library device 20 that is superior in the viewpoint of power consumption amount, on the basis of the measured power consumption amount, the file size (corresponding to U), and the file access interval time (corresponding to T(D)). At that time, the condition generation unit 52 updates the graph each time the power consumption amounts of the RAID device 10 and the tape library device 20 are acquired by the measurement unit 51 and the power consumption amounts are updated.

Next, a process of reading and writing a file stored in the RAID device 10 from the server 30 will be described in detail. As a premise, a unit of data is handled as a file, and the file is assumed to be stored in the RAID device 10. From the server 30, an access to a file is made by a write request and a read request to the RAID device 10. At that time, with respect to the file stored in the RAID device 10, the time t(access) of the previous write access or the previous read access is recorded on the server 30 for each file.

Figure 6:
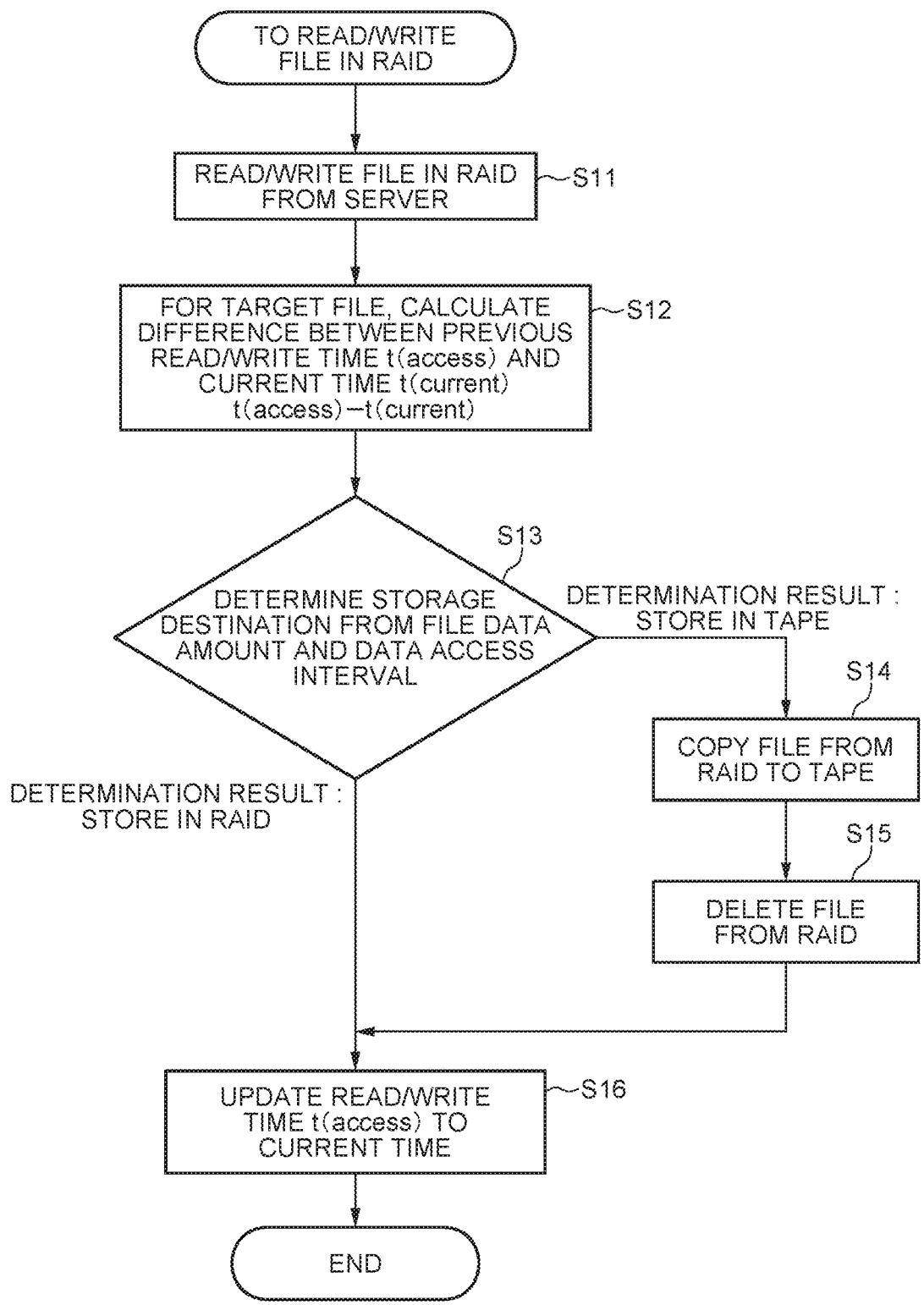
FIG. 6 is a flowchart illustrating an exemplary process of reading or writing a file in a RAID device from a server in the first exemplary embodiment of the present invention.

FIG. 6 is a flowchart illustrating an exemplary process of reading or writing a file stored in the RAID device 10. Referring to FIG. 6, when a read access or a write access (hereinafter referred to as a read/write access) is generated with respect to a file, the RAID file access unit 53 executes a read request or a write request to the file on the RAID device 10 (step S11). Then, the RAID file access unit 53 records the time t(current) of the current read/write access on the server 30, and calculates the difference from the time t(access) when read/write was executed previously on the same file as an elapsed time (step S12). The elapsed time, that is, t(current)−t(access), corresponds to the data access interval T(D).

Next, the RAID file access unit 53 determines a current file storage destination from the data amount of the target file of the current read/write access and the data access interval, in accordance with a conditional expression for the data access interval to the data amount according to FIG. 4 (step S13). When the storage destination is determined to be the tape, the RAID file access unit 53 copies the file from the RAID device 10 to the tape library device 20 (step S14), deletes the source file from the RAID device 10, and releases the area (step S15). Meanwhile, when the storage destination of the file is determined to be the RAID, the RAID file access unit 53 allows the file to remain in the RAID device. Even in either determination, the RAID file access unit 53 updates the time t(access) of the target file of the current read/write access to the current time (step S16).

Next, a process of reading a file stored in the tape library device 20 from the server 30 will be described in detail.

Figure 7:
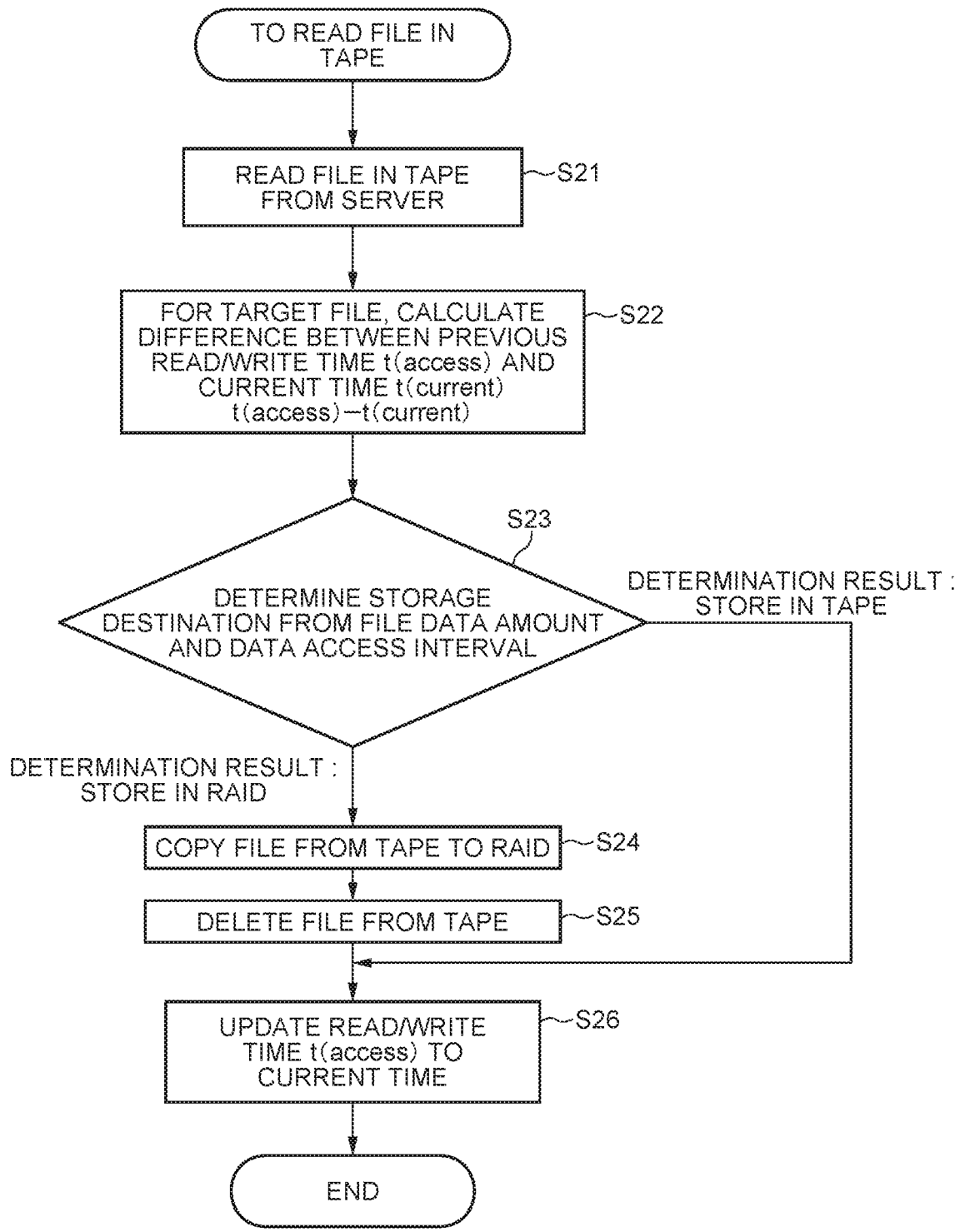
FIG. 7 is a flowchart illustrating an exemplary process of reading a file in a tape library device from a server in the first exemplary embodiment of the present invention.

FIG. 7 is a flowchart illustrating an example of a process of reading a file in the tape library device 20. Referring to FIG. 7, when a read request is generated to a file moved to the tape library device 20, the tape file access unit 54 reads the file from the tape library device 20 (step S21). Then, the tape file access unit 54 records the current read time t(current) in the server 30, and calculates the difference from the time t(access) when read/write was executed previously on the same file as an elapsed time (step S22).

Then, the tape file access unit 54 determines a current file storage destination from the data amount of the target file of the current read access and the data access interval, in accordance with a conditional expression for the data access interval to the data amount according to FIG. 4 (step S23). When the storage destination of the file is determined to be the tape, the tape file access unit 54 allows the file to remain in the tape library device 20. Meanwhile, when the storage destination is determined to be the RAID device, the tape file access unit 54 copies the target file of the current read access from the tape library device 20 to the RAID device 10 (step S24), and deletes the source file in the tape library device 20 (step S25). Even in either determination, the tape file access unit 54 updates the read/write time t(access) to the current time (step S26).

Next, a process of writing a file stored in the tape library device 20 from the server 30 will be described in detail.

Figure 8:
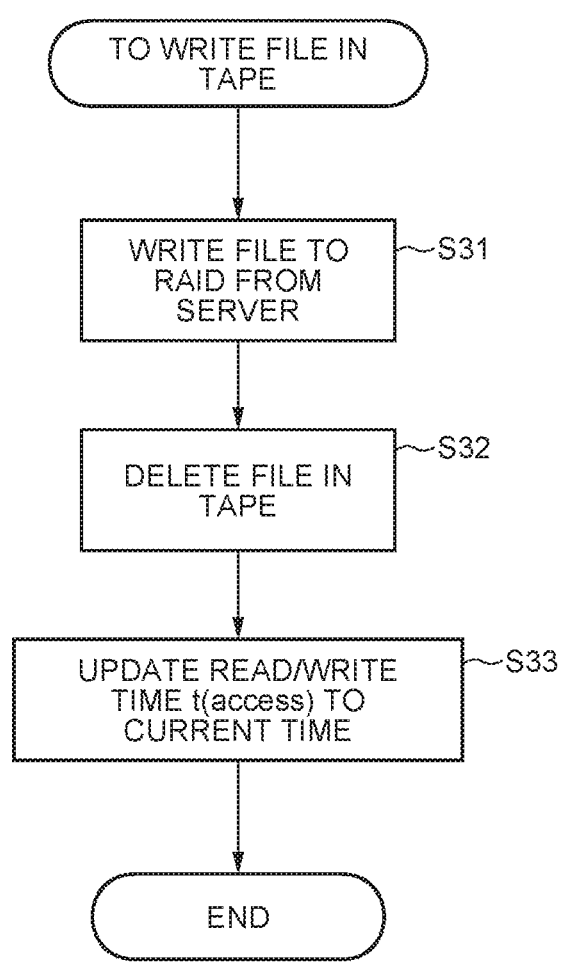
FIG. 8 is a flowchart illustrating an exemplary process of writing a file in a tape library device from a server in the first exemplary embodiment of the present invention.

FIG. 8 is a flowchart illustrating an exemplary process of writing a file stored in the tape library device 20 from the server 30. Referring to FIG. 8, when a write request is generated to a file moved to the tape library device 20, the tape file access unit 54 writes the file into the RAID device 10 (step S31). Thereafter, the tape file access unit 54 deletes the source file from the tape library device 20 (step S32). Then, the tape file access unit 54 updates the read/write time t(access) of the file to the current time (step S33).

When the server 30 copies a file in the RAID device 10 to the tape library device 20 or deletes the file in the tape library device 20, in order to make them efficient, the server 30 may accumulate the operations (copying, deletion) to be performed on the target tape medium in the server 30 a certain period of time and put them in a schedule to thereby reduce the number of times of loading the tape medium 21 to the tape drive 24.

As described above, according to the present embodiment, first, the power consumption amount of each of the RAID device and the tape library device is measured, values of a plurality of times of measurement are compiled in a list along with respective operation modes when measured, and the power consumption values of the respective operation modes are calculated. Then, the power consumption value of each operation mode is updated periodically, and is used as a parameter of a conditional expression for determining the file storage destination. Thereby, it is possible to eliminate the difference between the actual power consumption value and the defined parameter that may be caused by defining the parameter value in advance. Further, since the power consumption value is updated periodically even in the case where the power consumption value varies due to the installation environment, it is possible to improve the accuracy in determining the storage destination. As a result, the power consumption amount of the hierarchical storage can be suppressed by data relocation.

Second Exemplary Embodiment

Figure 9:
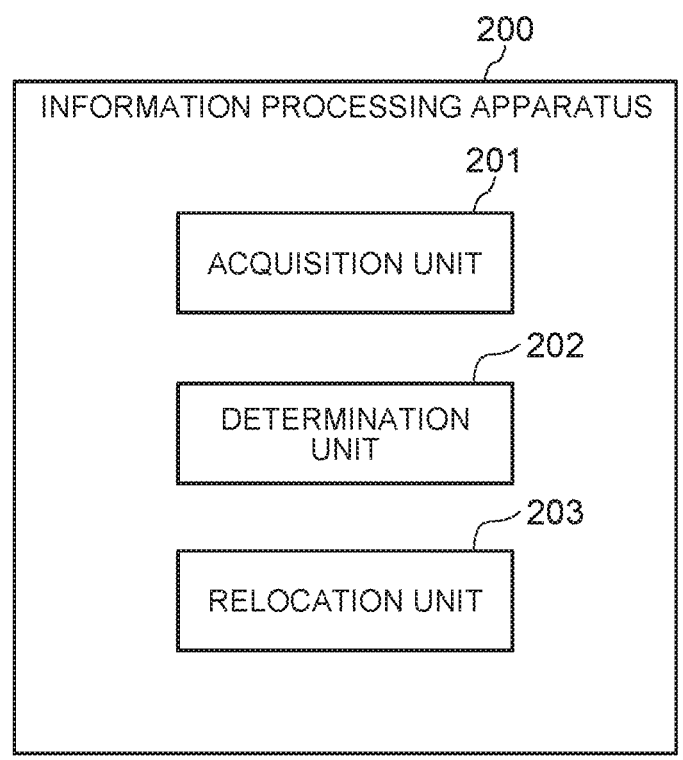
FIG. 9 is a block diagram of a storage management system according to a second exemplary embodiment of the present invention.

Next, a second exemplary embodiment of the present invention will be described with reference to FIG. 9. FIG. 9 is a block diagram illustrating a configuration of an information processing apparatus according to the second exemplary embodiment. The present embodiment illustrates an outline of the configuration of the server 30 constituting the storage management system 100 described in the first exemplary embodiment.

As illustrated in FIG. 9, an information processing apparatus 200 of the present embodiment is the information processing apparatus 200 that manages a hierarchical storage including a primary storage and a secondary storage.

The information processing apparatus 200 includes
an acquisition unit 201 that acquires a measurement value obtained by measuring a power consumption amount of each of the primary storage and the secondary storage,
a determination unit 202 that determines whether or not to move a file between the primary storage and the secondary storage, on the basis of a condition for determining a storage destination of the file to be stored in the hierarchical storage with use of the measurement value of the power consumption amount, the size of the file, and the access interval time of the file, and
a relocation unit 203 that moves the file between the primary storage and the secondary storage in accordance with the determination.

Note that the acquisition unit 201, the determination unit 202, and the relocation unit 203 are implemented by execution of a program by the information processing apparatus.

The information processing apparatus 200 having the above-described configuration operates to perform processing of
acquiring a measurement value obtained by measuring a power consumption amount of each of the primary storage and the secondary storage,
determining whether or not to move a file between the primary storage and the secondary storage, on the basis of a condition for determining a storage destination of the file to be stored in the hierarchical storage with use of the measurement value of the power consumption amount, the size of the file, and the access interval time of the file, and
moving the file between the primary storage and the secondary storage in accordance with the determination.

According to the invention described above, the power consumption amount of the hierarchical storage is measured, and the measurement value is set to a conditional expression for determining the storage destination of a file, whereby it is determined whether or not to move the file. As described above, since the storage destination of a file can be determined with use of the actual power consumption value of the hierarchical storage, it is possible to determine the storage destination in which the power consumption amount can be reduced more appropriately. As a result, it is possible to suppress the power consumption amount of the hierarchical storage by data relocation.

SUPPLEMENTARY NOTES

The whole or part of the exemplary embodiments disclosed above can be described as, but not limited to, the following supplementary notes. Hereinafter, outlines of the configurations of an information processing apparatus, an information processing system, an information processing method, and a program according to the present invention will be described. However, the present invention is not limited to the configurations described below.

Supplementary Note 1

An information processing apparatus that manages a hierarchical storage including a primary storage and a secondary storage, the apparatus comprising:

an acquisition unit that acquires a measurement value obtained by measuring a power consumption amount of each of the primary storage and the secondary storage;

a determination unit that determines whether or not to move a file between the primary storage and the secondary storage, on a basis of a condition for determining a storage destination of the file to be stored in the hierarchical storage with use of the measurement value, a size of the file, and an access interval time of the file; and a relocation unit that moves the file between the primary storage and the secondary storage in accordance with determination.

Supplementary Note 2

The information processing apparatus according to supplementary note 1, wherein
the acquisition unit acquires, as the measurement value, an average value of the power consumption amounts measured a plurality of times.

Supplementary Note 3

The information processing apparatus according to supplementary note 1 or 2, wherein
the acquisition unit acquires the measurement value obtained by measuring the power consumption amount in each operation mode of at least one of the primary storage and the secondary storage.

Supplementary Note 4

The information processing apparatus according to supplementary note 3, wherein
the acquisition unit acquires, as the measurement value, an average value of the power consumption amounts measured a plurality of times in each operation mode of at least one of the primary storage and the secondary storage.

Supplementary Note 5

The information processing apparatus according to supplementary note 3 or 4, wherein
the primary storage is a disk device, and the secondary storage is a magnetic tape device, and
the acquisition unit acquires the measurement value by measuring a power consumption amount of the disk device, and acquires the measurement value by measuring a power consumption amount in each operation mode of the magnetic tape device.

Supplementary Note 6

The information processing apparatus according to supplementary note 5, wherein
as the power consumption amount in each operation mode of the magnetic tape device, the acquisition unit acquires at least one of a power consumption amount when a tape medium in a slot is moved by an accessor, a power consumption amount when the tape medium is loaded to a tape drive, a power consumption amount when the tape medium is located by the tape drive, a power consumption amount when the rape medium is unloaded from the tape drive, a power consumption amount during reading by the tape drive, and a power consumption amount during waiting, as the measurement value.

Supplementary Note 7

The information processing apparatus according to any of supplementary notes 1 to 6, wherein
the primary storage is a disk device, and the secondary storage is a magnetic tape device, and
the condition is given by a following expression:

$$T(D) \geq \{3600 \times Ph(Tmove) + P(Tread)/V(Tread) \times U \times U\}/\{(P(Dread) - P(Twait)) \times U\}$$

where T(D) represent the access interval time, U represents the size, Ph(Tmove) represents a power consumption amount for an motor operation of an accessor in the magnetic tape device and for locating a tape medium by a motor of a tape drive, P(Tread) represents power consumption required for reading a unit capacity by the magnetic tape device, V(Tread) represents a transfer velocity of the tape drive of the magnetic tape device, P(Dread) represents power consumption required for reading a unit data capacity by the disk device, and P(Twait) represents power consumption required for waiting of the magnetic tape device per unit capacity.

Supplementary Note 8

An information processing method performed by an information processing apparatus that manages a hierarchical storage including a primary storage and a secondary storage, the method comprising:
acquiring a measurement value obtained by measuring a power consumption amount of each of the primary storage and the secondary storage;
determining whether or not to move a file between the primary storage and the secondary storage, on a basis of a condition for determining a storage destination of the file to be stored in the hierarchical storage with use of the measurement value, a size of the file, and an access interval time of the file; and
moving the file between the primary storage and the secondary storage in accordance with determination.

Supplementary Note 9

A program for causing an information processing apparatus to realize, the information processing apparatus managing a hierarchical storage including a primary storage and a secondary storage:
an acquisition unit that acquires a measurement value obtained by measuring a power consumption amount of each of the primary storage and the secondary storage;
a determination unit that determines whether or not to move a file between the primary storage and the secondary storage, on a basis of a condition for determining a storage destination of the file to be stored in the hierarchical storage with use of the measurement value, a size of the file, and an access interval time of the file; and
a relocation unit that moves the file between the primary storage and the secondary storage in accordance with determination.

Supplementary Note 10

An information processing system comprising:
a hierarchical storage including a primary storage and a secondary storage;
an information processing apparatus that manages the hierarchical storage; and a measurement device that measures a power consumption amount of each of the primary storage and the secondary storage, wherein the information processing apparatus includes:

an acquisition unit that acquires a measurement value obtained by measuring the power consumption amount of each of the primary storage and the secondary storage;

a determination unit that determines whether or not to move a file between the primary storage and the secondary storage, on a basis of a condition for determining a storage destination of the file to be stored in the hierarchical storage with use of the measurement value, a size of the file, and an access interval time of the file; and a relocation unit that moves the file between the primary storage and the secondary storage in accordance with determination.

Note that the program described above is stored using a non-transitory computer readable medium of any type, and can be supplied to a computer. A non-transitory computer readable medium includes a tangible storage medium of any type. Examples of a non-transitory computer readable medium includes a magnetic recording medium (for example, flexible disk, magnetic tape, hard disk drive), a magneto-optical recording medium (for example, magneto-optical disk), a CD-ROM (Read Only Memory), a CD-R, a CD-R/W, and a semiconductor memory (for example, mask ROM, PROM (Programmable ROM), EPROM (Erasable PROM), a flash ROM, and RAM (Random Access Memory)). Further, the program may be supplied to a computer by a transitory computer readable medium of any type. Examples of a transitory computer readable medium include an electrical signal, an optical signal, and an electromagnetic wave. A transitory computer readable medium can supply the program to a computer via a wired communication channel such as an electric wire and an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2018-049576, filed on Mar. 16, 2018, the disclosure of which is incorporated herein in its entirety by reference.

REFERENCE SIGNS LIST

10 RAID device
11 RAID controller
12 hard disk
20 tape library device
21 tape medium
22 accessor
23 tape controller
24 tape drive
25 slot
30 server
31, 32 interface cable
33, 34, 35 LAN cable
41, 42 wattmeter
50 hierarchical storage management unit
51 measurement unit
52 condition generation unit
53 RAID file access unit
54 tape file access unit
100 storage management system
200 information processing apparatus
201 acquisition unit
202 determination unit
203 relocation unit

The invention claimed is:

1. An information processing apparatus that manages a hierarchical storage including a primary storage and a secondary storage, the apparatus comprising:

a memory in which processing instructions are stored; and at least one processor configured to execute the processing instructions, wherein the at least one processor is configured to execute processing of:

acquiring a measurement value obtained by measuring a power consumption amount of each of the primary storage and the secondary storage;

determining, based on a condition that determines a storage destination of the file to be stored in the hierarchical storage, whether or not to move a file between the primary storage and the secondary storage wherein the condition uses the measurement value, a size of the file, and an access interval time of the file; and moving the file between the primary storage and the secondary storage in accordance with the condition, wherein the primary storage is a disk device, and the secondary storage is a magnetic tape device, and the condition is given by a following expression:

$$T(D) \geq \{3600 \times Ph(Tmove) + P(Tread)/V(Tread) \times U \times U\} / \{(P(Dread) - P(Twait)) \times U\}$$

where T(D) represent the access interval time, U represents the size, Ph(Tmove) represents a power consumption amount i) of a motor operation of an accessor in the magnetic tape device and ii) of locating a tape medium by a motor of a tape drive, P(Tread) represents power consumption required for reading a unit capacity by the magnetic tape device, V(Tread) represents a transfer velocity of the tape drive of the magnetic tape device, P(Dread) represents power consumption required for reading a unit data capacity by the disk device, and P(Twait) represents power consumption, per unit capacity, required for waiting of the magnetic tape device.

2. The information processing apparatus according to claim 1, wherein measuring the power consumption amount of each of the primary storage and the secondary storage comprises obtaining, respectively for each of the primary storage and the secondary storage, an average power consumption.

3. The information processing apparatus according to claim 1, wherein measuring the power consumption amount of each of the primary storage comprises obtaining, from at least one of the primary storage and the secondary storage, power consumption of each operational mode of the at least one of the primary storage and the secondary storage.

4. The information processing apparatus according to claim 3, wherein obtaining, from the at least one of the primary storage and the secondary storage, the power consumption of each of the operational mode of the at least one of the primary storage and the secondary storage comprises obtaining from the at least one of the primary storage and the secondary storage, a corresponding average power consumption.

5. The information processing apparatus according to claim 1, wherein measuring the power consumption amount of each of the primary storage and the secondary storage further comprises measuring power consumption of the disk device, and measuring power consumption of each operational mode of the magnetic tape device.

6. The information processing apparatus according to claim 5, wherein
the power consumption of each operation mode of the magnetic tape device comprises at least one of a power consumption amount when a tape medium in a slot is moved by an accessor, a power consumption amount when the tape medium is loaded to a tape drive, a power consumption amount when the tape medium is located by the tape drive, a power consumption amount when the tape medium is unloaded from the tape drive, a power consumption amount during reading by the tape drive, and a power consumption amount during waiting.

7. An information processing method performed by an information processing apparatus that manages a hierarchical storage including a primary storage and a secondary storage, the method comprising:
acquiring a measurement value obtained by measuring a power consumption amount of each of the primary storage and the secondary storage;
determining, based on a condition that determines a storage destination of the file to be stored in the hierarchical storage, whether or not to move a file between the primary storage and the secondary storage wherein the condition uses the measurement value, a size of the file, and an access interval time of the file; and
moving the file between the primary storage and the secondary storage in accordance with the condition, wherein
the primary storage is a disk device, and the secondary storage is a magnetic tape device, and
the condition is given by a following expression:

$$T(D) \geq \{3600 \times Ph(Tmove) + P(Tread)/V(Tread) \times U \times U\}/\{(P(Dread) - P(Twait)) \times U\}$$

where T(D) represent the access interval time, U represents the size, Ph(Tmove) represents a power consumption amount i) of a motor operation of an accessor in the magnetic tape device and ii) of locating a tape medium by a motor of a tape drive, P(Tread) represents power consumption required for reading a unit capacity by the magnetic tape device, V(Tread) represents a transfer velocity of the tape drive of the magnetic tape device, P(Dread) represents power consumption required for reading a unit data capacity by the disk device, and P(Twait) represents power consumption, per unit capacity, required for waiting of the magnetic tape device.

8. An information processing system comprising:
a hierarchical storage including a primary storage and a secondary storage;
an information processing apparatus that manages the hierarchical storage; and
a measurement device that measures a power consumption amount of each of the primary storage and the secondary storage, wherein
the information processing apparatus includes:
a memory in which processing instructions are stored; and
at least one processor configured to execute the processing instructions, and
the at least one processor is configured to execute processing of:
acquiring a measurement value obtained by measuring the power consumption amount of each of the primary storage and the secondary storage;
determining, based on a condition that determines a storage destination of the file to be stored in the hierarchical storage, whether or not to move a file between the primary storage and the secondary storage wherein the condition uses the measurement value, a size of the file, and an access interval time of the file; and
moving the file between the primary storage and the secondary storage in accordance with the condition, wherein
the primary storage is a disk device, and the secondary storage is a magnetic tape device, and
the condition is given by a following expression:

$$T(D) \geq \{3600 \times Ph(Tmove) + P(Tread)/V(Tread) \times U \times U\}/\{(P(Dread) - P(Twait)) \times U\}$$

where T(D) represent the access interval time, U represents the size, Ph(Tmove) represents a power consumption amount i) of a motor operation of an accessor in the magnetic tape device and ii) of locating a tape medium by a motor of a tape drive, P(Tread) represents power consumption required for reading a unit capacity by the magnetic tape device, V(Tread) represents a transfer velocity of the tape drive of the magnetic tape device, P(Dread) represents power consumption required for reading a unit data capacity by the disk device, and P(Twait) represents power consumption, per unit capacity, required for waiting of the magnetic tape device.

9. The information processing method according to claim 7, wherein measuring the power consumption amount of each of the primary storage and the secondary storage comprises obtaining, respectively for each of the primary storage and the secondary storage, an average power consumption.

10. The information processing method according to claim 7, wherein measuring the power consumption amount of each of the primary storage comprises obtaining, from at least one of the primary storage and the secondary storage, power consumption of each operational mode of the at least one of the primary storage and the secondary storage.

11. The information processing method according to claim 10, wherein obtaining, from the at least one of the primary storage and the secondary storage, the power consumption of each of the operational mode of the at least one of the primary storage and the secondary storage comprises obtaining from the at least one of the primary storage and the secondary storage, a corresponding average power consumption.

12. The information processing method according to claim 7, wherein measuring the power consumption amount of each of the primary storage and the secondary storage further comprises measuring power consumption of the disk device, and measuring power consumption of each operational mode of the magnetic tape device.

13. The information processing method according to claim 12, wherein
the power consumption of each operation mode of the magnetic tape device comprises at least one of a power consumption amount when a tape medium in a slot is moved by an accessor, a power consumption amount when the tape medium is loaded to a tape drive, a power consumption amount when the tape medium is located by the tape drive, a power consumption amount when the rape medium is unloaded from the tape drive, a power consumption amount during reading by the tape drive, and a power consumption amount during waiting.

* * * * *